(12) United States Patent
Siemens et al.

(10) Patent No.: US 7,876,780 B2
(45) Date of Patent: Jan. 25, 2011

(54) METHOD FOR MANAGING NETWORK RESOURCES AND NETWORK MANAGEMENT DEVICE

(75) Inventors: Eduard Siemens, Sehnde (DE); Frank Glaeser, Hannover (DE); Jens Brocke, Laatzen (DE); Stefan Kubsch, Hohnhorst (DE); Ralf Koehler, Hannover (DE); Andreas Aust, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 143 days.

(21) Appl. No.: 12/229,273

(22) Filed: Aug. 21, 2008

(65) Prior Publication Data

US 2009/0067327 A1  Mar. 12, 2009

(30) Foreign Application Priority Data

Sep. 11, 2007  (EP) .................................. 07116158

(51) Int. Cl.
  *H04W 4/00* (2009.01)
  *H04W 72/00* (2009.01)
  *H04J 3/16* (2006.01)
  *H04L 12/28* (2006.01)
(52) U.S. Cl. .................. 370/468; 370/338; 370/395.21; 455/450
(58) Field of Classification Search .......... 370/468, 370/335, 395.21, 465, 395.4, 328, 329, 338, 370/330, 341, 395.2, 396, 397, 392, 398, 370/395.3, 400, 352; 455/450, 452.1, 452.2, 455/456.2
See application file for complete search history.

(56) References Cited

U.S. PATENT DOCUMENTS

| 2005/0096031 A1* | 5/2005 | Sugaya et al. ............ 455/422.1 |
| 2006/0250977 A1 | 11/2006 | Gao |
| 2008/0112337 A1* | 5/2008 | Shaffer et al. ............... 370/260 |

OTHER PUBLICATIONS

Domenico Ferrari, Amit Gupta, Giorgio Ventre: "Distributed advance reservation of real-time connections" International Science Institute, {Online} Mar. 1995-2003) XP002470544 Berkeley, California.

(Continued)

*Primary Examiner*—Hanh Nguyen
(74) *Attorney, Agent, or Firm*—Robert D. Shedd; Joseph J. Opalach; Jerome G. Schaefer

(57) ABSTRACT

The invention relates to a method for managing network resources in a network with a network management device (M), a network component (A), and a further network component (B), and a network management device (M), the method comprising the following steps: transmitting a request for an advance reservation of a network resource by the network component (A) to the network management device (M), wherein the request includes information regarding a reservation start time and a reservation end time; transmitting a request for an ad-hoc reservation of a further network resource by the further network component (B) to the network management device (M); allocating the further network resource to the further network component (B) by the network management device (M); and allocating the network resource to the network component (A) by the network management device (M) at the reservation start time, wherein the network resource comprises a part or all of the further network resource.

8 Claims, 2 Drawing Sheets

OTHER PUBLICATIONS

CH Bouras et al: "Performance Analysis of Adaptive Admission Control Algorithms for Bandwidth Brokers" Journal of Network and Systems Management, Kluwer Academic Publishers-Plenum Publishers, NE vol. 15, No. 2, May 24, 2007 pp. 191-218, XP019504712 ISSN: 1573-7705.

Lars-Olof Burchard: "Networks with Advance Reservations: Applications, Architecture, and Performance" Journal of Network and Systems Management, Kluwer Academic Publishers-Plenum Publishers, NE vol. 13, No. 4 Dec. 1, 2005 pp. 4290449 XP019283605.

Schill A. et al.; "Internetworking over ATM: Experiences with IP/IPng and RSVP" Computer Networks and ISDN Systems, North Holland Publishing, Amsterdam NL. vol. 28, No. 14, Nov. 1996 pp. 1915-1927, XP004014502.

European Search Report Feb. 26, 2008.

\* cited by examiner

METHOD FOR MANAGING NETWORK RESOURCES AND NETWORK MANAGEMENT DEVICE

This application claims the benefit, under 35 U.S.C. §119 of European Patent Application 07116158.2, filed Sep. 11, 2007.

FIELD OF THE INVENTION

The invention relates to a method for managing network resources and a network management device.

BACKGROUND OF THE INVENTION

In a communication network, network components are connected via communication links and usually share network resources. An important one of such network resources is for example the bandwidth used for communication between two network components. Due to limited availability of communication bandwidth, communication networks need means and functionality for managing the allocation of the available bandwidth for the different communication links between network components.

For example, sophisticated functions and measures pertaining to Quality of Service (QoS) in telecommunication networks for signalling and managing resource demands are necessary in order to build complex service-oriented packet-switched networks using the widespread IP protocol. Some approaches like Diff-Serv (RFC2475, compare S. Blake et al., *An Architecture for Differentiated Services*, Request for Comments, IETF, December 1998) rely on logically connection-less network services. However, more sophisticated and reliable services like IntServ (RFC2205, compare R. Braden et al., *Resource ReSerVation Protocol (RSVP)—Version 1 Functional Specification*, Request for Comments, IETF, September 1997), MPLS (RFC3031, compare E. Rosen et al., *Multiprotocol Label Switching Architecture*, Request for Comments, IETF, January 2001), and some kinds of VPNs (Virtual Private Networks), rely on connection-oriented semantics. Herein, a connection simply refers to a virtual abstraction of an ordered data flow, regardless of how that data flow is established or managed.

Especially in conjunction with very high demands of network resources, connection-oriented semantics can be essential for a thrifty resource management within a QoS-aware network. Since distributed applications are used by a variety of entities, including humans, it is often necessary to assure that network resources can be made available to a distributed application at a predefined point in time. For that purpose, some proposals for advance reservations are in place.

Advance reservation means a reservation of a network resource or of network resources in advance. It ensures that network management entities can properly schedule their available network resources and assure that network resources requested my means of advance reservation can be guaranteed for the scheduled time slot. In conjunction with an RSVP signalling protocol (RSVP—Resource reSerVation Protocol), such advance reservation mechanisms have been described in L. C. Wolf et al., *Issues of Reserving Resources in Advance*, Lecture Notes in Computer Science, 1995, and D. Ferrari, A. Gupta, G. Ventre, *Distributed Advance Reservation of Real-time Connections*, in Proceedings of "Network and Operating System Support for Digital Audio and Video", 1995. The fundamental difference between advance reservation (also called scheduled reservation) and "normal", so-called ad-hoc reservation is that for the advance reservation, the desired start time as well as the duration of the reservation are known or must be given. In contrast, no start time or duration needs to be supplied for an ad-hoc reservation.

Since an ad-hoc reservation corresponds to semantics of almost conventional connection-oriented applications, the coexistence of ad-hoc reservations with advance reservations must be ensured. This constraint leads usually to partitioning of network resources and therefore to less efficient network resource usage. Alternatively, the partitioning can be avoided, but this would lead to an inefficient resource scheduling. To reduce the drawbacks of resource partitioning, some measures have been proposed to make the partition border dynamically movable to some extent.

Nevertheless, performance-oriented or "performance-greedy" applications, such as applications within film production environments, often demand use for all or nearly all of the available network resources, leading to failure of the above described partition schemes.

SUMMARY OF THE INVENTION

It is thus the objective of the invention to provide a method and a device for more efficiently managing network resources, in particular for network resource scheduling when allowing for side by side requests for ad-hoc and advance reservations.

The objective is met by a method for managing network resources according to independent claim 1 and a network management device according to independent claim 8.

According to one aspect of the invention, a method for managing network resources in a network with a network management device, a network component and a further network component is provided, the method comprising the following steps: transmitting a request for an advance reservation of a network resource by the network component to the network management device, wherein the request includes information regarding a reservation start time and a reservation end time; transmitting a request for an ad-hoc reservation of further network resource by the further network component to the network management device; allocating the further network resource to the further network component by the network management device; and allocating the network resource to the network component by the network management device at the reservation start time, wherein the network resource comprises a part or all of the further network resource.

According to a further aspect of the invention, a network management device is provided, comprising: receiving means configured to receive a request for an advance reservation of a network resource transmitted by a network component, wherein the request includes information regarding a reservation start time and a reservation end time, and to receive a request for an ad-hoc reservation of a further network resource by the further network component; allocation means configured to allocate a network resource to the network component and a further network resource to the further network component, wherein the network resource comprises a part or all of the further network resource; and memory means configured to store information indicating ad-hoc reservation and advance reservation of network resources.

In other words, the network component reserves in advance the network resource, which it needs at a later time. Conventionally, none of the thus reserved network resource is allocated to other network components and therefore tied up otherwise, until the reservation start time, when the reserved network resource is allocated to the network component.

Compared to conventional resource management processes, the afore described method has the advantage that the further network resource may be allocated to the further network component despite the fact that they constitute at least a part of the network resource that have already been reserved for the network component. This leads to a significant improvement in efficiency in the utilization of the available network resources, since the network resource reserved for the network component is not completely "blocked" for the entire time until the reservation start time. This approach is of particular use in cases, where there are no more or not enough free network resources left for use in ad-hoc reservation, namely from the ad-hoc reservation pool.

Conversely, by reallocating a part or all of the further network resource to the network component, it is ensured that the network component obtains the network resource at the scheduled reservation start time and for an intended duration, in order to allow the network component to plan accordingly. The transmitting of the request for the advance reservation may occur before or after the transmitting of the request for the ad-hoc reservation.

The network management device managing or administering the network resources may be a centralized entity or a decentralized or distributed entity. The reallocation may be performed in a Session Initiation Protocol (SIP) by means of a changed CONNECT method of a SIP session control, or in an RSVP by means of a changed resource reservation within an appropriate RSVP session.

In an advantageous embodiment of the invention, the method further comprises a step of transmitting a service degradation mark to the further network component when allocating the further network resource to the further network component, wherein the service degradation mark indicates to the further network component that the further network resource is available for reallocation at least in part away from the further network component at a future time. The service degradation mark may be included in a confirmation message to the further network component, which confirms that pursuant to the request of the further network component the further network resource has been allocated accordingly. Owing to the service degradation mark, the further network component is thus informed that the obtained further network resource is just "borrowed" and may be reallocated in part or completely. The further network component may thus anticipate such future service degradation and plan ahead. Once the reallocation occurs, the further network component may react appropriately, for example by switching to a best-effort service.

In a further development of the invention, the method further comprises a step of transmitting further information regarding the part or complete reallocation of the further network resource away from the further network component at the future time. One example of such further information is information regarding the reservation start time. This has the advantage that the further network component may prepare even better for the reallocation, since it knows the exact time the reallocation will take place. Furthermore, the further information may include the reservation end time, the extent of the reallocation that will take place, i.e. how much of the further network resource will be reallocated, and the like.

In a favourable enhancement of the invention, the method further comprises a step of providing service degradation information to the further network component when allocating the network resource to the network component. This will assure that the network component knows the reason for the service degradation due to the reallocation of part or all of the further network resource, and is able to react appropriately.

The signalling may be performed shortly before, during, or shortly after the allocation takes place.

In a favourable embodiment of the invention, the method further comprises a step of waiting a predetermined guaranteed reservation time after allocating the further network resource to the further network component, before allocating the network resource to the network component by the network management device at the reservation start time. Thus, the ad-hoc reservation of the further network resource is guaranteed at least for the length of the guaranteed reservation time. This is particularly important in the case when the transmitting of the request for the advance reservation occurs after the transmitting of the request for the ad-hoc reservation. In this embodiment, it is ensured that the further network resource which has just been allocated to the further network component will not immediately be reallocated to the network component, before the former has any chance to utilize it at all.

In an advantageous embodiment of the invention, the method further comprises a step of waiting a predetermined protected interval time after transmission of the request for advance reservation of the network resource by the network component to the network management device, before allocating the network resource to the network component by the network management device at the reservation start time. In one embodiment, the further network component will be informed about the advance reservation having been requested. This will ensure that the further network component has at least the protected interval time in order to "wrap up" the most vital aspects of utilizing the further network resource, before it is reallocated to the network component.

In a further embodiment of the invention, the method further comprises steps of defining a reservation time frame around the reservation start time, transmitting a demand message from the network component to the network management device within the reservation time frame to request allocation of the network resource to the network component, and allocating the network resource to the network component once the demand message has been received by the network management device. The network management device can thus mark the network resource as reserved by the network component from the reservation start time on. However, in order to initiate the allocation process, the network component will still have to send the demand message as a confirmation that it is ready to utilize the reserved network resource. If no demand message is received by the network management device within the reservation time frame, the reserved network resource may be freed and released back into the advance reservation pool for further use through an ad-hoc or an advance reservation. This has the advantage of ensuring that the network resource is not being occupied without being utilized by the network component.

BRIEF DESCRIPTION OF THE DRAWINGS

In the following, the invention will be described by means of advantageous embodiments with reference to figures of a drawing. Herein.

DETAILED DESCRIPTION OF THE INVENTION

Figure 1:
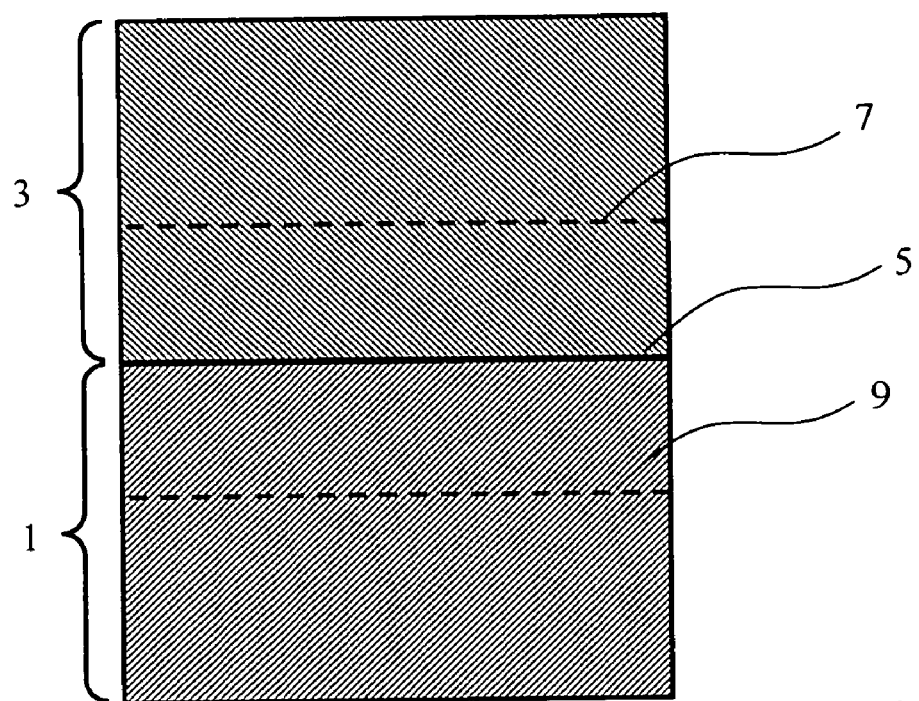
FIG. 1 shows schematically a partitioning of network resources in a network.

FIG. 1 shows a schematic of a partitioning of network resources into an ad-hoc reservation pool 3 and an advance reservation pool 1, between which a partition border or partition boundary 5 is located. However, a rigid partition boundary would lead to a very inflexible and low efficient resource scheduling, if for instance at a certain point in time all network resources from the one pool 1 (or 3) are already allocated while the other pool 3 (or 1) is almost not used.

For this reason, the partition boundary 5 is provided as a dynamic partition boundary 5, which may move from a maximum ad-hoc reservation boundary 9 position to a maximum advance reservation boundary 7 position. In other words, the region between the two maximum boundaries 7, 9 may be assigned as belonging to the ad-hoc reservation pool 3 or to the advance reservation pool 1, depending on necessity.

While the depiction in FIG. 1 shows a symmetrical situation, wherein the two reservation pools 1, 3 have same actual and maximum sizes, the situation may be asymmetrical depending on the configuration of the network and the requirements of its components.

Figure 2:
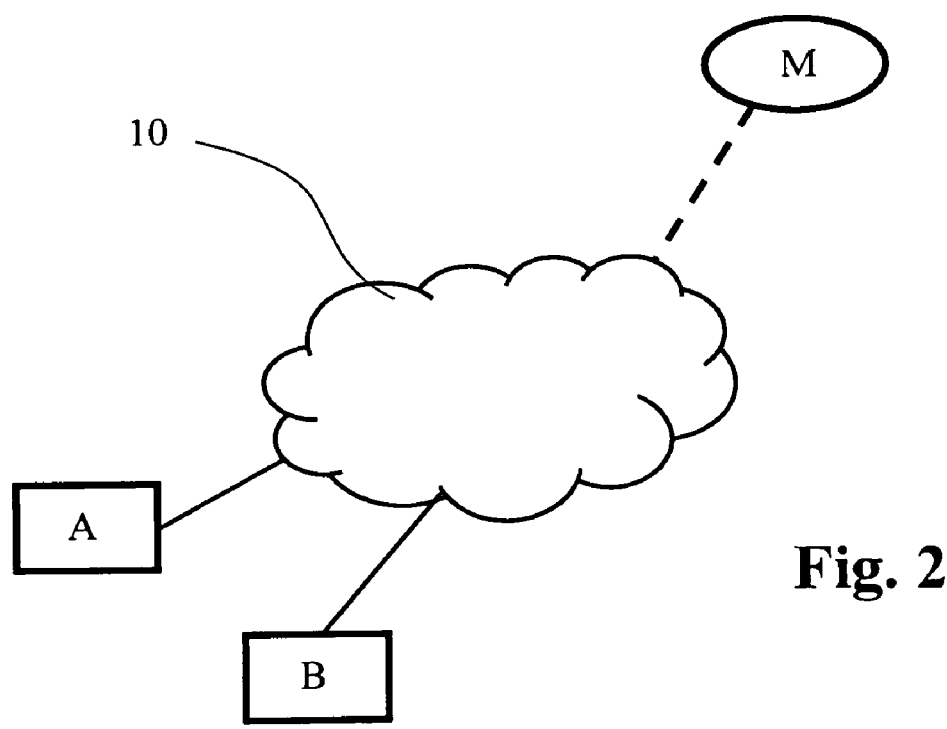
FIG. 2 shows a schematic of a network.

FIG. 2 shows a schematic of a network 10 with a network management device M, a network component A and a further network component B. For example, the network 10 may be a Quality-of-Service-aware (QoS-aware) packet-switched network. The network management device M, for example a QoS device, is responsible for managing the distribution of network resources, in particular of bandwidth, in the network 10. As an example, the network component A transmits a request for an advance reservation to the network manager M, whereby the request includes information regarding a desired reservation start time 11 and reservation end time 13. If sufficient network resources are available for the desired time period, the network management device M will record the advance reservation, for example by including an appropriate entry into a reservation table (not shown).

When the further network component B transmits a request for an ad-hoc reservation of a further network resource 4 to the network management device M, the latter will allocate the further network resource 4 out of the ad-hoc reservation pool 3, if this is possible. However, if all of the network resource from the ad-hoc reservation pool 3 is already in use and there is still sufficient network resources free in the advance reservation pool 1, the network management device M will resort to allocating the further network resource 4 to the further network component B out of the advance reservation pool 1.

Since the further network resource 4 will be needed as part of the network resource 2 reserved in advance by the network component A, the network management device M also transmits a service degradation mark to the further network component B, for example as part of a confirmation message, which confirms the ad-hoc reservation. The degradation mark may be sent for example if the ad-hoc reservation pool is filled up to the maximum advance reservation boundary 7 or up to the maximum ad-hoc reservation boundary 9, depending on implementation of the management method.

It is also possible that the request sent by the further network component B includes a message stating that it might also accept an ad-hoc reservation of the further network resource 4 being subject to service degradation at a later point in time. This might increase its chances of receiving the requested further network resource 4.

The service degradation mark can be implemented, for example, as a vendor-specific header attribute within a CONNECT method of a Session Initiation Protocol (SIP) session control, or as a new object within a RSVP Path and a RSVP Reservation message. In the latter case, this object can be injected into the RSVP Path message by the first RSVP node that has knowledge of resource sharing between the ad-hoc and advance reservation resource pools 1, 3 within the network 10.

When the reservation start time 11 approaches, the network management device M will allocate the network resource 2 requested by the network component A to the network component A, which necessitates the reallocation of at least part of the further network resource 4. Though this action will lead to service degradation for the further network component B, the further network component B has been prepared due to the service degradation mark and can react properly. Possible reactions to such service degradation can be a change to another video and/or audio codec, switching to a best-effort service, or a disconnection request with an appropriate disconnection reason.

On the other hand, if an application running on the further network component B can under no circumstances be used with reduced network resources, the further network component B upon receiving the service degradation mark can decline a session initiation and either cancel its request for the ad-hoc reservation of the further network resource 2 or in turn request an advance reservation of network resources on its own.

In many instances, the utilization of the reserved network resource 2 by the network component A will not take place at exactly the reservation start time 11. One of the reasons for that can be the use of not absolutely synchronized clocks, but also unavailability of network resources at endpoints of communications (e.g., a human initiator of a session might not be available at exactly the reservation start time 11). For this reason, it is reasonable to indicate the actual usage of the network resource 2, by explicitly sending a resource usage or demand message at the beginning of a session (compare L. C. Wolf et al., *Issues of Reserving Resources in Advance*, Lecture Notes in Computer Science, 1995, and A. Schill et al., *Resource Reservation in Advance in Heterogeneous Networks with Partial ATM Infrastructure*, INFOCOM 1997).

However, the resource usage may not be started at exactly the reserved start time 11, but rather within a time frame around the reserved start time 11. For that reason, in one embodiment (not shown) a reservation time frame of an appropriate duration is defined around the reservation start time 11, within which the actual or real start time for resource usage must be signalled or indicated by the network component A via the demand message. In absence of the demand message within the reservation time frame, the network resource 2 reserved in advance will be released and put back to the pool for ad-hoc and advance reservations.

If the demand message arrives before the scheduled reservation start time 11, but within the reservation time frame, the duration of usage may be counted from the time of arrival of the demand message. If the network resource 2 is used by an application run on the network component A by humans, a reasonable time frame around the reservation start time 11 can be for example of a duration calculated as 2*min (0.1*time between request of advance reservation and reservation start time 11 0.1*service duration), wherein service duration is a duration, during which the network resource 2 is to be allocated to the network component A, i.e. the period between the reservation start time 11 and the reservation end time 13.

When performing the above described method, a situation may arise, whereby the network component A requests an advance reservation of the network resource 2, whereby the network resource 2 comprises the further network resource 4, which has just been allocated to and in use by the further network component B. In order to minimize the disadvantage for the further network component B, a mechanism shown in FIG. 3 might be implemented.

Figure 3:
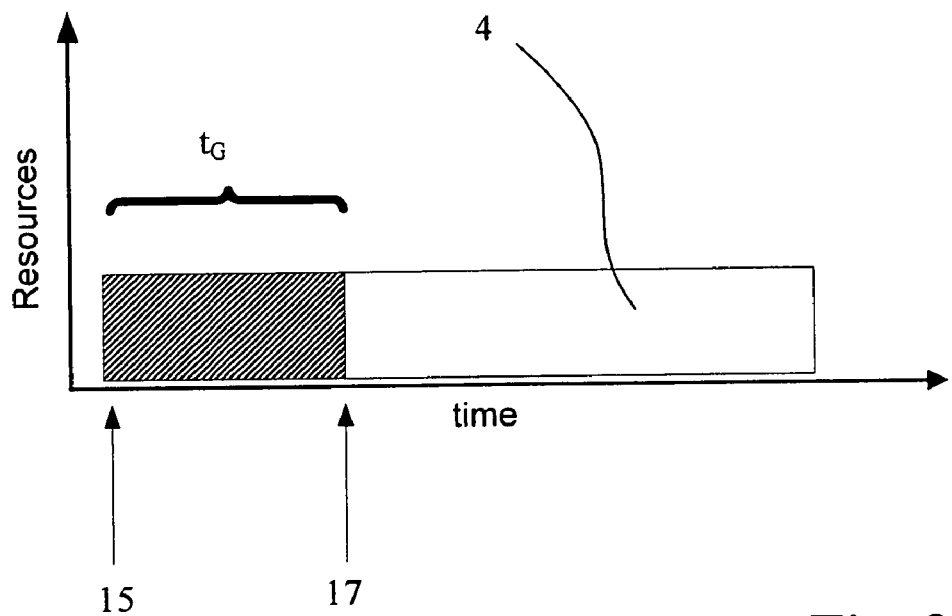
FIG. 3 illustrates the provision of a guaranteed reservation time.

According to FIG. 3, a guaranteed reservation time $t_G$ may be granted for each ad-hoc reservation. In other words, when the further network resource 4 is allocated to the further network component B, it is guaranteed that it is not taken back and reallocated otherwise within the guaranteed reservation time $t_G$. It is not possible for the network component A to reserve this resource during this time via an advance reservation. Thus FIG. 3 indicates an ad-hoc usage start time 15 and an earliest reservation start time 17. The length of the guaranteed reservation time $t_G$ depends on the application. For example, in a film production environment, the guaranteed reservation time $t_G$ could be in the range of a few minutes.

As described above, it is possible to move the dynamic partition boundary 5 depicted in FIG. 1 and reserve resources dynamically in ad-hoc or advance fashion as needed. In one possible scenario, the network component A will request an advance reservation for the near future of the network resource 2, comprising the further network resource 4, which is presently allocated to and used by the further network component B. In some cases, this further network resource 4 should not be immediately available for advance reservation, as it is necessary to allow the further network component B for example to finish data transmission in a controlled manner.

Figure 4:
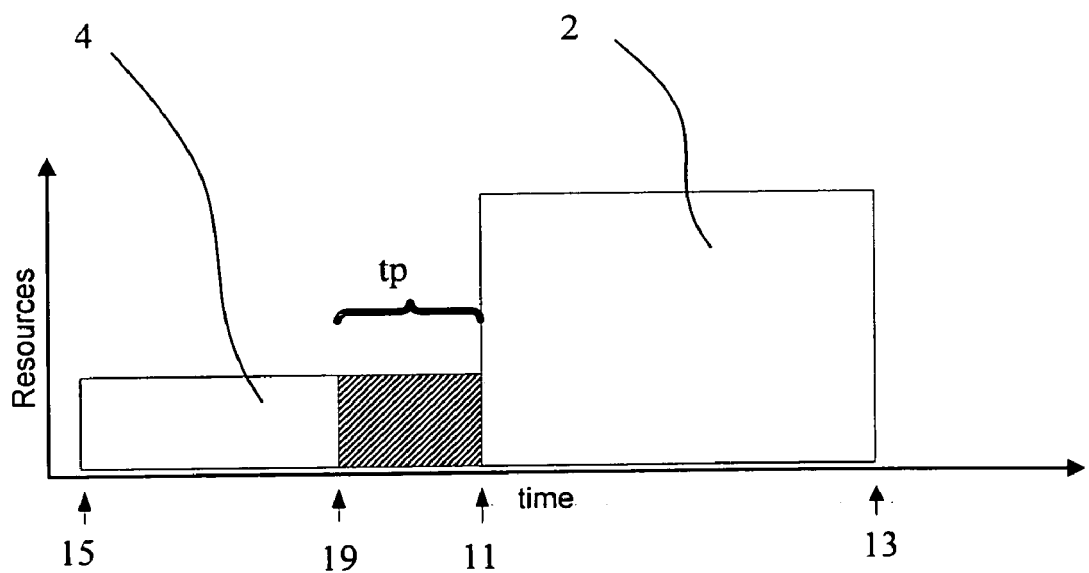
FIG. 4 illustrates the provision of a protected interval time.

This situation is illustrated in FIG. 4. As shown there, a mandatory delay is provided between the time, when the network component A requests the network resource 2, and the earliest possible reservation start time 11. This mandatory delay is a protected interval time $t_P$. That means, the allocation of the further network resource 4 to the further network component B is protected for the duration of the predefined protected interval time $t_P$. Advantageously, when the network component A transmits its request at the time of request for advance reservation 19, the further network component B is informed about the degradation of service being about to take place and can therefore use the protected interval time $t_P$ to adjust to the service degradation in a controlled manner.

The features of the invention as disclosed in the above description, in the claims and in the drawing may be of importance for the implementation of the various embodiments of the invention both individually and in any desired combination.

What is claimed is:

1. Method for managing network resources in a network with a network management device (M), a first network component (A), and a second network component (B), network resources being partitioned into at least an ad-hoc reservation pool and an advance reservation pool, the method comprising the following steps:

transmitting a request for an advance reservation of a first network resource by the first network component (A) to the network management device (M), wherein said first network resource is comprised entirely in the advance reservation pool, wherein the request includes information regarding a reservation start time and a reservation end time;

transmitting a request for an ad-hoc reservation of a second network resource by the second network component (B) to the network management device (M);

allocating the second network resource to the second network component (B) by the network management device (M), wherein said first network resource comprises at least partly said second network resource; and, at the reservation start time:
        freeing the part of said second network resource comprised in said first network resource and
        allocating the first network resource to the first network component (A) by the network management device (M).

2. Method according to claim 1, wherein the method further comprises a step of transmitting a service degradation mark to the second network component (B) when allocating the second network resource to the second network component (B), wherein the service degradation mark indicates to the second network component (B) that the part of said second network resource comprised in said first network resource is likely to be freed from the second network component (B) and released back into the advance reservation pool for a reallocation to the first network component (A), at a future time.

3. Method according to claim 2, wherein the method further comprises a step of transmitting further information regarding the reallocation of the part of said second network resource comprised in said first network resource to the first network component (A) at the future time.

4. Method according to claim 1, wherein the method further comprises a step of providing service degradation information to the second network component (B) when allocating the first network resource to the first network component (A).

5. Method according to claim 1, wherein the allocation of the first network resource to the first network component (A) by the network management device (M) occurs at the end of a first time period starting at the allocation of the second network resource to the second network component (B), said first time period lasting a predetermined guaranteed reservation time ($t_G$).

6. Method according to claim 1, wherein a second time period starting at the transmission of the request for the advance reservation of the first network resource by the first network component to the network management device (M) and lasting a predetermined protected interval time ($t_p$), wherein the allocation of the first network resource to the first network component (A) by the network management device (M) occurs at the reservation start time or at the end of said second time period if said second time period expires after the reservation start time.

7. Method according to claim 1, wherein the method further comprises steps of:

defining a reservation time frame around the reservation start time,
    transmitting a demand message from the first network component (A) to the network management device (M) within the reservation time frame to request allocation of the first network resource to the first network component (A), and
    allocating the first network resource to the first network component (A) once the demand message has been received by the network management device (M).

8. Network management device (M), comprising:

receiving means configured to receive a request for an advance reservation of a first network resource transmitted by a first network component (A), wherein the request contains information regarding a reservation start time and a reservation end time, and to receive a request for an ad-hoc reservation of a second network resource by the second network component (B);

memory means configured to store information indicating ad-hoc reservation and advance reservation of network resources for said first and second network components (A, B), wherein said memory means are partitioned into at least an ad-hoc reservation pool and an advance reservation pool; and allocation means configured to allocate the first network resource to the first network component (A) and the second network resource to the second network component (B), wherein the second network resource is at least partly comprised in said first network resource.

\* \* \* \* \*